US007076441B2

(12) United States Patent
Hind et al.

(10) Patent No.: US 7,076,441 B2
(45) Date of Patent: Jul. 11, 2006

(54) IDENTIFICATION AND TRACKING OF PERSONS USING RFID-TAGGED ITEMS IN STORE ENVIRONMENTS

(75) Inventors: John R. Hind, Raleigh, NC (US); James M. Mathewson, II, Chapel Hill, NC (US); Marcia L. Peters, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1059 days.

(21) Appl. No.: 09/847,889

(22) Filed: May 3, 2001

(65) Prior Publication Data

US 2002/0165758 A1    Nov. 7, 2002

(51) Int. Cl.
*G06Q 99/00* (2006.01)
(52) U.S. Cl. ...................................................... 705/10
(58) Field of Classification Search .................. 705/10
See application file for complete search history.

(56) References Cited

U.S. PATENT DOCUMENTS

| | | | | |
|---|---|---|---|---|
| 5,995,015 A * | 11/1999 | DeTemple et al. | ...... | 340/825.49 |
| 6,294,999 B1 * | 9/2001 | Yarin et al. | ............... | 340/573.1 |
| 6,484,148 B1 * | 11/2002 | Boyd | ........................... | 705/14 |
| 6,563,423 B1 * | 5/2003 | Smith | ...................... | 340/572.1 |
| 6,577,275 B1 * | 6/2003 | Turner | ......................... | 342/465 |
| 6,659,344 B1 * | 12/2003 | Otto et al. | ................... | 235/381 |
| 6,700,960 B1 * | 3/2004 | Kaufman et al. | ...... | 379/112.01 |
| 6,865,546 B1 * | 3/2005 | Song | ........................... | 705/26 |
| 2003/0040922 A1 * | 2/2003 | Bodin | ........................... | 705/1 |

FOREIGN PATENT DOCUMENTS

JP        2002-319001 A  * 10/2002

OTHER PUBLICATIONS

Jones, Working Without Wires, Industrial Distribution, Aug. 1999, p. M6, M8-M9 [PROQUEST].*
Welling, Unveiling AIM's store of the future, part I, Apparel Industry Magazine, vol. 6, No. 2, Feb. 2000, p. 24-31 [DIALOG: file 15].*
Quinlan, Radio Tags—The New Identifier, Handling & Shipping Management, vol. 26, Apr. 1985, start p. 90 [DIALOG: file 148].*

(Continued)

*Primary Examiner*—Susanna M. Diaz
(74) *Attorney, Agent, or Firm*—Synnestvedt & Lechner LLP; Martin J. McKinley

(57) ABSTRACT

A method and system for identifying and tracking persons using RFID-tagged items carried on the persons. Previous purchase records for each person who shops at a retail store are collected by POS terminals and stored in a transaction database. When a person carrying or wearing items having RFID tags enters the store or other designated area, a RFID tag scanner located therein scans the RFID tags on that person and reads the RFID tag information. The RFID tag information collected from the person is correlated with transaction records stored in the transaction database according to known correlation algorithms. Based on the results of the correlation, the exact identity of the person or certain characteristics about the person can be determined. This information is used to monitor the movement of the person through the store or other areas.

27 Claims, 4 Drawing Sheets

OTHER PUBLICATIONS

Langnau, Application in RFID, Materials Handling Management, vol. 55, No. 9, Sep. 2000, p. 43-45 [DIALOG: file 15].*

Want et al., Ubiquitous Electronic Tagging, Submitted to IEEE Concurrency, Dec. 1999 [GOOGLE].*

Dawe et al. "Information Supply Chain: Build Systems to Meet Needs." Transportation & Distribution, vol. 38, No. 4, pp. 28, 30, 32, Apr. 1997.*

Janoff, Barry. "Lines of Communication." Progressive Grocer, vol. 80, No. 6, pp. 69-70, Jun. 2001.*

Co-pending U.S. Appl. No. 09/790,104, filed Feb. 21, 2001, entitled "Method to Address Security and Privacy Issues of the Use of RFID Systems to Track Consumer Products", and invented by Hind et al.; cited on p. 2 of present application.

Co-pending U.S. Appl. No. 09/814,350, filed Mar. 22, 2001, entitled "Method and System for Providing Personalized Store-Issued Coupons Prior to Shopping", and invented by Dickson et al.; cited on p. 13 of present application.

Co-pending U.S. Appl. No. 09/836,963, filed Apr. 18, 2001, entitled "Method and System for Providing Targeted Advertising in Public Places and Carriers", and invented by Peters et al.; cited on p. 14 of present application.

* cited by examiner

IDENTIFICATION AND TRACKING OF PERSONS USING RFID-TAGGED ITEMS IN STORE ENVIRONMENTS

BACKGROUND OF THE INVENTION

1. Field of the Invention

The present invention relates to individual identification and tracking systems and, more particularly, to a system and method for identifying and tracking persons using RFID (Radio Frequency Identification) tagged items carried on the persons.

2. Description of the Related Art

Manufacturers, distributers and/or retailers have a need to track their products. Conventionally, a manufacturer, a distributor or a retailer attaches a Radio Frequency Identification (RFID) tag on each product to identify and track their merchandise. By the transmission and reception of radio signals to and from the RFID tag on the product, the product can be tracked from the time of manufacture to the time of sale without any direct visual or physical contact with the product being monitored. RFID tag information typically stored in a RFID tag of a product includes (1) a retail SKU number (e.g., UPC—universal product code) identifying the name, manufacturer and/or suggested price of the product, (2) a unique serial number identifying the product, or (3) the SKU number and the unique serial number. In the past, the SKU numbers have been printed on products in the form of bar codes which can be read by a Point-of-Sale (POS) terminal having a bar code scanner. A typical use of the SKU number is to look up the product price at the time of purchase. Merchants also use the SKU numbers to keep track of inventory so that they know which products are selling well and when to reorder the products from wholesalers. The unique serial number stored in a RFID tag can be a globally unique number or a number assigned in series to products manufactured in the same product category.

A typical RFID tag on a product includes an antenna and a silicon chip containing modulation circuits, control logic and non-volatile memory. The silicon chip derives electrical power from radio signals received by the antenna or from a battery, and is able to exchange data with a RFID tag scanner by demodulating and modulating the radio signals. The non-volatile memory of the RFID tag typically has a storage capacity of 5 to 256 bytes. A computer coupled to the RFID tag scanner can read and write to and from the memory of the RFID tag using radio signal transmission. A detailed description of the structure and operation of a RFID tag for a product is discussed in a co-pending application, U.S. application Ser. No. 09/790,104, filed on Feb. 21, 2001, owned by the assignee of the present application, and entitled "Method to Address Security and Privacy Issues of the Use of RFID Systems to Track Consumer Products", which is herein fully incorporated by reference.

Due to the recent development of RFID tag technology, RFID tags can be manufactured inexpensively and in non-conspicuous miniature sizes, so that they can be integrated into products during the manufacturing process of the products, rather than being attached to the packaging of the products.

SUMMARY OF THE INVENTION

The present invention provides a new method and system for using RFID tagged items carried on persons to identify and track the persons. The tracking information can be used to provide targeted advertising and to improve existing store systems and tracking systems.

In one embodiment, previous purchase records of persons (e.g., customers) who shop at a store are collected by POS terminals and stored in a transaction database. When a person carrying or wearing items having RFID tags therein enters the store or other designated area, a RFID tag scanner located therein scans the RFID tags on that person and reads the RFID tag information. The RFID tag information collected from the person is correlated with transaction records stored in the transaction database to determine the exact identity of the person, or some characteristic about the person. Then, as that person moves around the store, different RFID tag scanners located throughout the store can pick up radio signals from the RFID tags carried on that person and the movement of that person is tracked based on these detections.

In another embodiment, without having any prior records of individuals and their purchase records, a person carrying RFID-tagged items can be scanned to identify a collection of items that the person is carrying. The present invention assigns a tracking number to that person based on the collected RFID tag information, and the tracking number is used to track the person's movement. In this embodiment, the exact identity (i.e., name, address, etc.) is not determined, but the person is still tracked based on their association with the collected RFID tag information.

In these embodiments, the tracking information can be used to provide targeted advertising to the person as the person roams through the store, or to analyze and improve existing store systems, such as the physical layout of the store, advertisement displays in the store, customer service systems in the store, lighting and other environmental settings in the store system, etc.

DETAILED DESCRIPTION OF THE PREFERRED EMBODIMENTS

Figure 1:
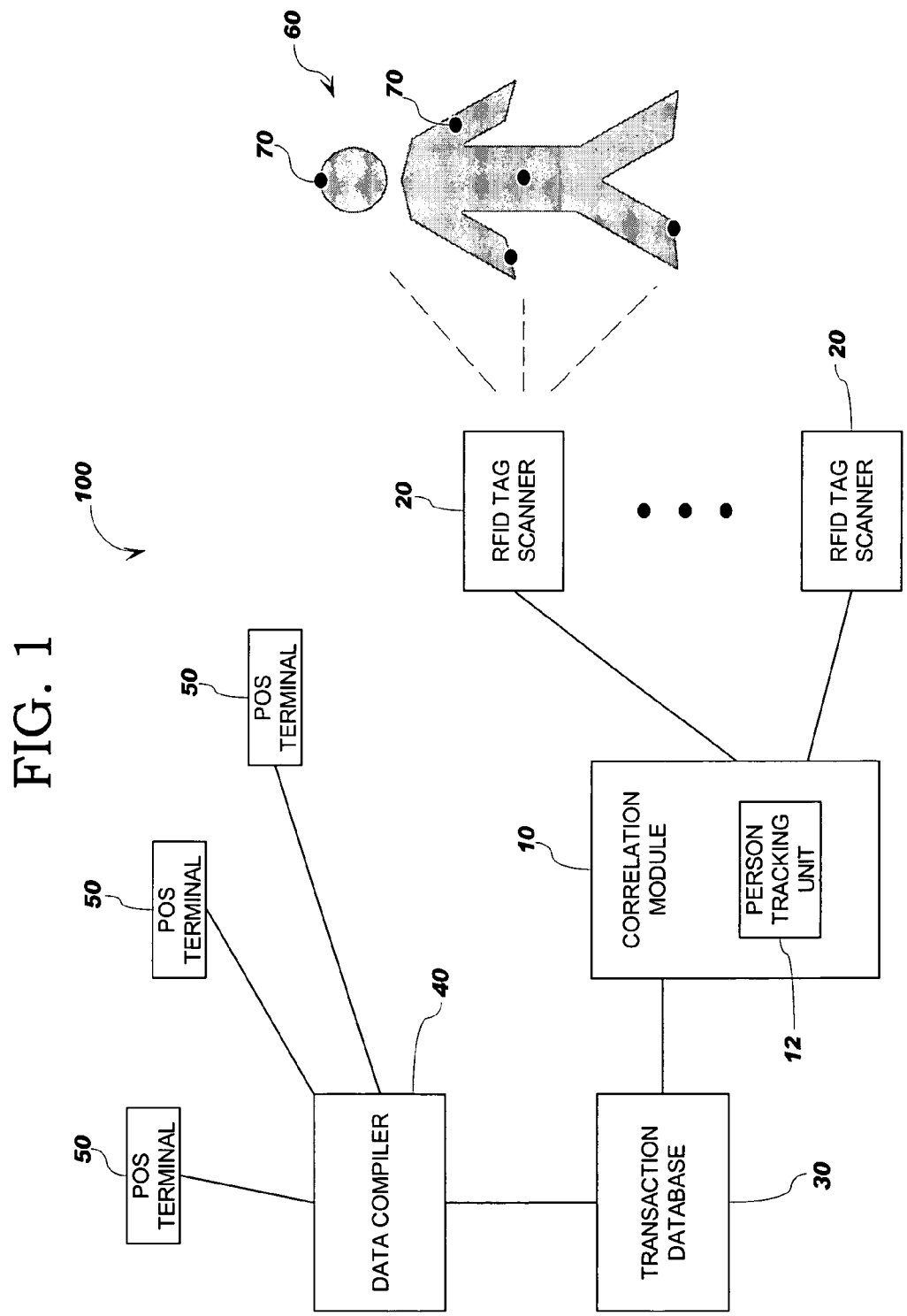
FIG. 1 is a block diagram of a person identification system using RFID-tagged items according to a first embodiment of the present invention.

In the drawings, the same reference numerals are used to designate the same elements.

FIG. 1 is a block diagram of a person identification and tracking system 100 according to a first embodiment of the present invention. The system 100 will be explained for use in a retail store, but is equally applicable in other locations or geographical areas. As shown in FIG. 1, the system 100 includes a plurality of RFID tag scanners 20, a correlation module 10 including a person tracking unit 12, a transaction database 30, a data compiler 40, and a plurality of POS (Point-of-Sale) terminals 50, all operatively coupled.

The POS terminals 50 are located at places, such as the front area of a retail store, where individuals (e.g., customers) render payment for merchandise. When the persons make purchases at the store, the purchase records collected by the POS terminals 50 are received by the data compiler 40. The purchase records may include information on products that the person has purchased (e.g., SKU number, unique serial number, etc.) as well as the personal information of the purchaser, such as the name, address, customer number, etc. Generally, the product information will be obtained by scanning bar codes on the products, and the personal information will be obtained when the person uses his or her credit card, bank card, shopper card or the like to render payment for the purchasing products. In some embodiments, the purchased product information may be obtained by the POS terminals 50 by detecting radio signals from RFID tags on the purchased products at the point of sale.

The data compiler 40 associates the personal information with the products that the person has purchased, and stores both the personal and purchased product information in the transaction database 30. The data compiler 40 also updates the personal and purchased product information stored in the transaction database 30 as the existing and new persons make new purchases.

The RFID tag scanners 20 are located throughout the "roaming" areas of the store. A roaming area is defined herein as any area where a person can move around freely. Each of the RFID tag scanners 20 is capable of scanning a predetermined range area and reads radio signals transmitted from RFID tags present in that range. In a preferred embodiment, RFID tags 70 are integrated into items and such items are introduced to the system 100 by persons 60 who are wearing or carrying such items. Any item can include a RFID tag and may be a hat, watch, belt, shoes, scarf, purse, wallet, clothing, briefcase, jewelry, or any other item that can be "carried" on or by a person. The RFID tags 70 are conventional RFID tags that are extremely small and inconspicuous although FIG. 1 has been drawn to exaggerate the size and location of the RFID tags 70. Depending on the application, the RFID tag 70 may store therein a retail SKU number, a unique serial number identifying the item, or both.

A collection of RFID tag information from all the RFID tags 70 carried on a single person 60 is read by the RFID tag scanner 20 and processed by the correlation module 10. Based on this collection of RFID tag information, the correlation module 10 identifies products on that person 60. The correlation module 10 correlates the identified product information with purchased product information stored in the transaction database 30 to determine the exact identity of the person 60. In another embodiment, instead of determining the exact identity of the person, some characteristics such as demographics (e.g., age, race, sex, etc.) about the person may be determined based on certain predetermined statistical information. For example, if items that are carried on the person are highly expensive name brands, e.g., Rolex watch, then the person may be classified in the upper-middle class income bracket. In another example, if the items that are carried on the person are "female" items typically associated with women, e.g., a purse, scarf, pantyhose, then the gender of the person can be determined as a female.

Particularly, the correlation by the correlation module 10 may result in several outcomes depending on the information stored in the transaction database 30 and the RFID tag information stored in the RFID tags 70. If the collection of RFID tag information contains unique serial numbers identifying the products carried by the person 60, the likelihood of determining the exact identity of the person 60 will be extremely high. However, if the collection of RFID tag information contains only SKU numbers, the correlation search result may indicate a plurality of individuals who would qualify as a match. In such cases, other criteria may be used to narrow the group of individuals to one particular person. For instance, the person who has the highest correlation percentage may be selected from the group of the identified persons.

When the system is configured to identify the general demographical information about the person, information such as the gender, age, social economic status, geographic location where they probably purchased the products, how long the products have been in service, etc., may be determined.

Once the exact identity or some demographics or other characteristics of the person have been determined, the person tracking unit 12 relies on this information to track the person 60 as the person 60 moves through the roaming areas. The person tracking unit 12 may assign a tracking number to each identified person and store the tracking number in association with the collection of RFID tagged product information.

As the person 60 moves through the roaming areas, different RFID tag scanners 20 located therein scan the RFID tags on the person 60. Each RFID tag scanner 20 transmits the detected RFID tag information to the person tracking unit 12 which in turn compares this information with different collections of RFID tag information to identify the tracking number or some other identification associated with the particular person to track the movement of the person. The person tracking unit 12 may keep records of different locations where the person 60 has visited as well as the visitation times in the roaming areas to track the person 60.

Once the movement of the person can be monitored based on the RFID tags carried on the person, the tracking information can be used in a number of different ways. For example, it can be used to provide targeted advertising to the person as the person roams. It can also be used to analyze and improve the effectiveness of the physical layout of the roaming areas, displays in the roaming areas, customer service areas in the roaming areas, lighting and other environmental settings in the roaming areas, etc.

Figure 2:
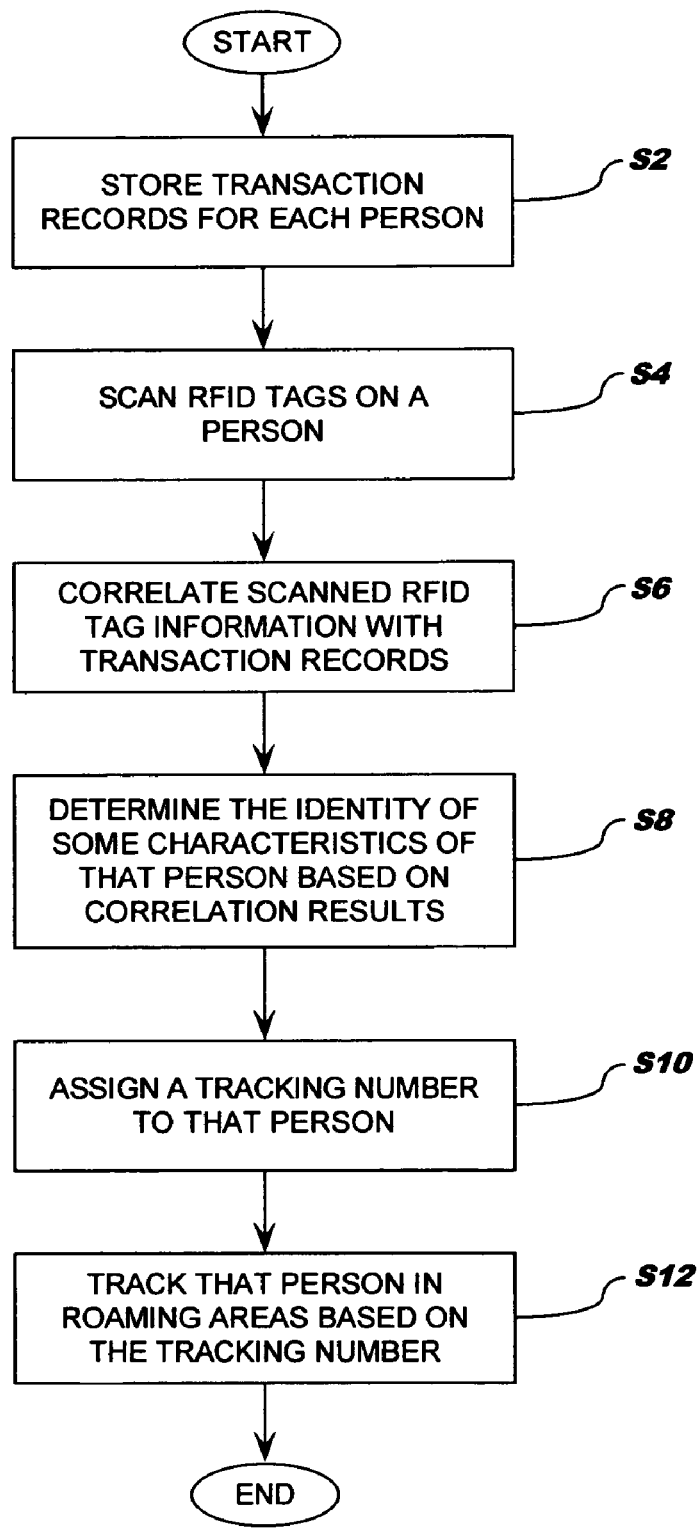
FIG. 2 is a flowchart illustrating the processing steps of a method of is identifying and tracking persons using RFID-tagged items according to a first embodiment of the present invention.

FIG. 2 is a flowchart illustrating the processing steps of a method of identifying and tracking persons using RFID-tagged items according to a first embodiment of the present invention. These processing steps can be implemented by the system 100 of FIG. 1. As shown in FIG. 2, in Step S2, transaction records (e.g., purchase history) for each person (e.g., customers at a retail store) are collected by the POS terminals 50 and stored in the transaction database 30 by the data compiler 40. Preferably, the transaction records are stored in association with the personal information of each purchaser.

In Step S4, when a person carrying or wearing items having RFID tags 70 as discussed above enters a scanning area of a particular RFID tag scanner 20, which may be located in any roaming area, the RFID tag scanner 20 scans the RFID tags on that person and reads the RFID tag information stored in the RFID tags 70. The collected RFID tag information is correlated with the transaction records stored in the transaction database 30 in Step S6 according to known correlation algorithms. In Step S8, based on the results of the correlation and depending on the application, the correlation module 10 determines the exact identity of the person or some demographics or other characteristics about the person as discussed above. Once the identify or some characteristics of the person can be determined, the person tracking unit 12 in Step S10 assigns a tracking number or some identification number to the collected RFID tag information. In Step S12, as the person moves through the roaming areas, different RFID tag scanners 20 located throughout the roaming areas scan the RFID tags carried on that person and the person tracking unit 12 tracks the movement of the person by associating the RFID tag information collected by the different scanners 20 and the tracking number.

Figure 3:
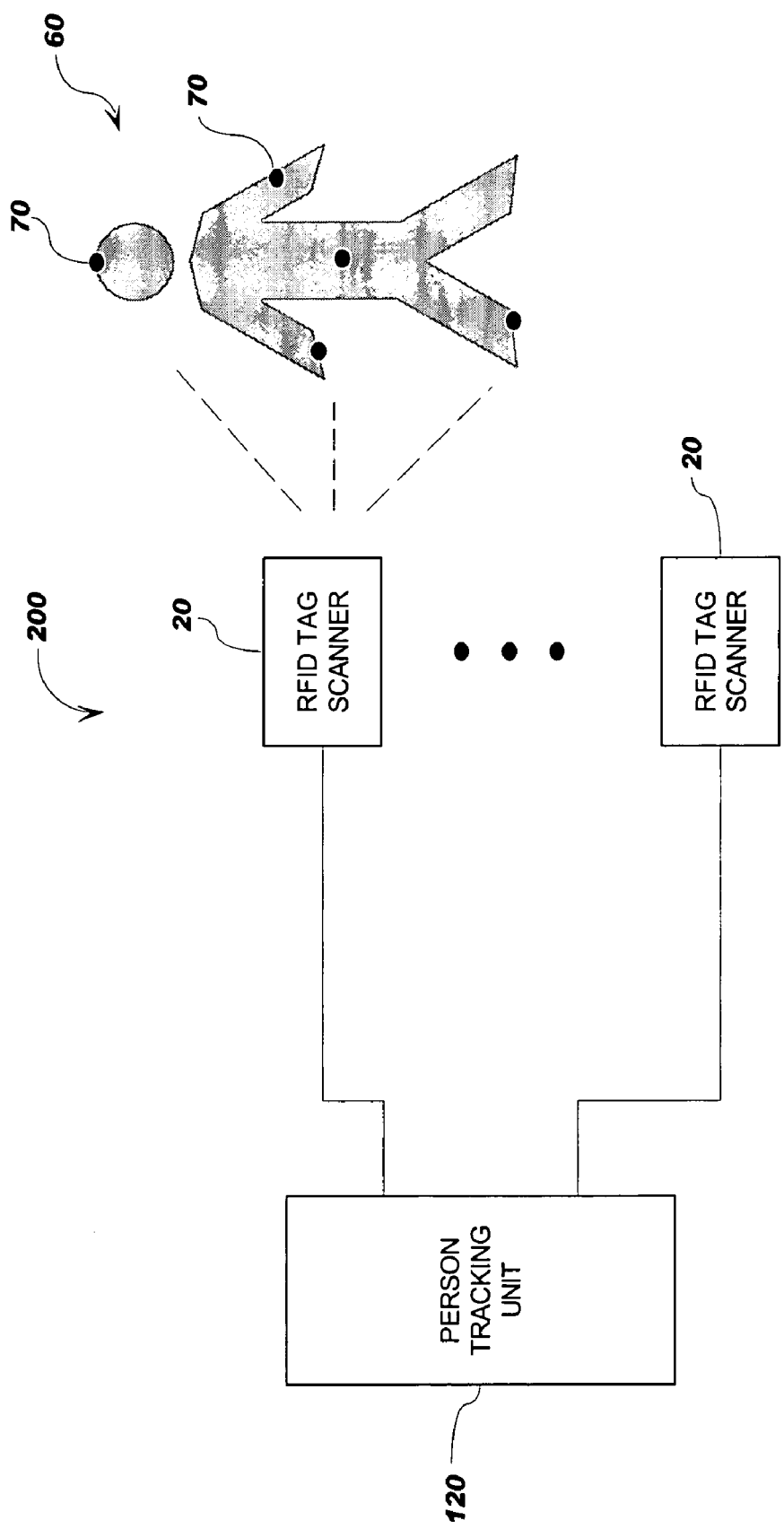
FIG. 3 is a block diagram of a person tracking system using RFID-tagged items according to a second embodiment of the present invention.

FIG. 3 is a block diagram of a tracking system 200 according to a second embodiment of the present invention. In this simple embodiment, without determining the exact identity (e.g., name and address) of the person, the person is still tracked by associating the person with information collected from RFID tags carried on the person. No purchase records of individuals are stored and used in the system 200. As shown in FIG. 3, the system 200 includes a person tracking unit 120 and a plurality of RFID tag scanners 20 that are located through roaming areas.

When a person 60 enters a retail store, a shopping mall, an airport, a train station, a train, or any location where a person can roam, a RFID tag scanner 20 located therein scans all identifiable RFID tags carried on the person 60 and obtains SKU numbers for the items carried on the person 60. This list or collection of items is then assigned to a particular tracking number or some identification number, so that this collection of items can be identified by that number. As the person 60 moves through the store or other roaming areas, different RFID tag scanners 20 located therein scan the RFID tags on the person 60, and each RFID tag scanner 20 transmits the detected RFID tag information to the person tracking unit 120. The person tracking unit 120 compares this information with different lists of items to identify the tracking number or the like associated with the person 60. In this manner, the movement of the person can be tracked. The person tracking unit 120 may keep records of different locations where the person 60 has visited as well as the visitation times to track the person 60.

As in the first embodiment, the tracking information collected in the second embodiment can be used in any application where such tracking information can be useful. For example, if the person is carrying a baby bottle, a store advertisement system may be configured to advertise diapers while the person is passing a particular display device in the store. If the person is carrying a man's wallet, the store advertisement system may be configured to advertise razor blades and shaving cream while the person is passing through a particular display device in the store. Obviously, numerous examples are possible.

Figure 4:
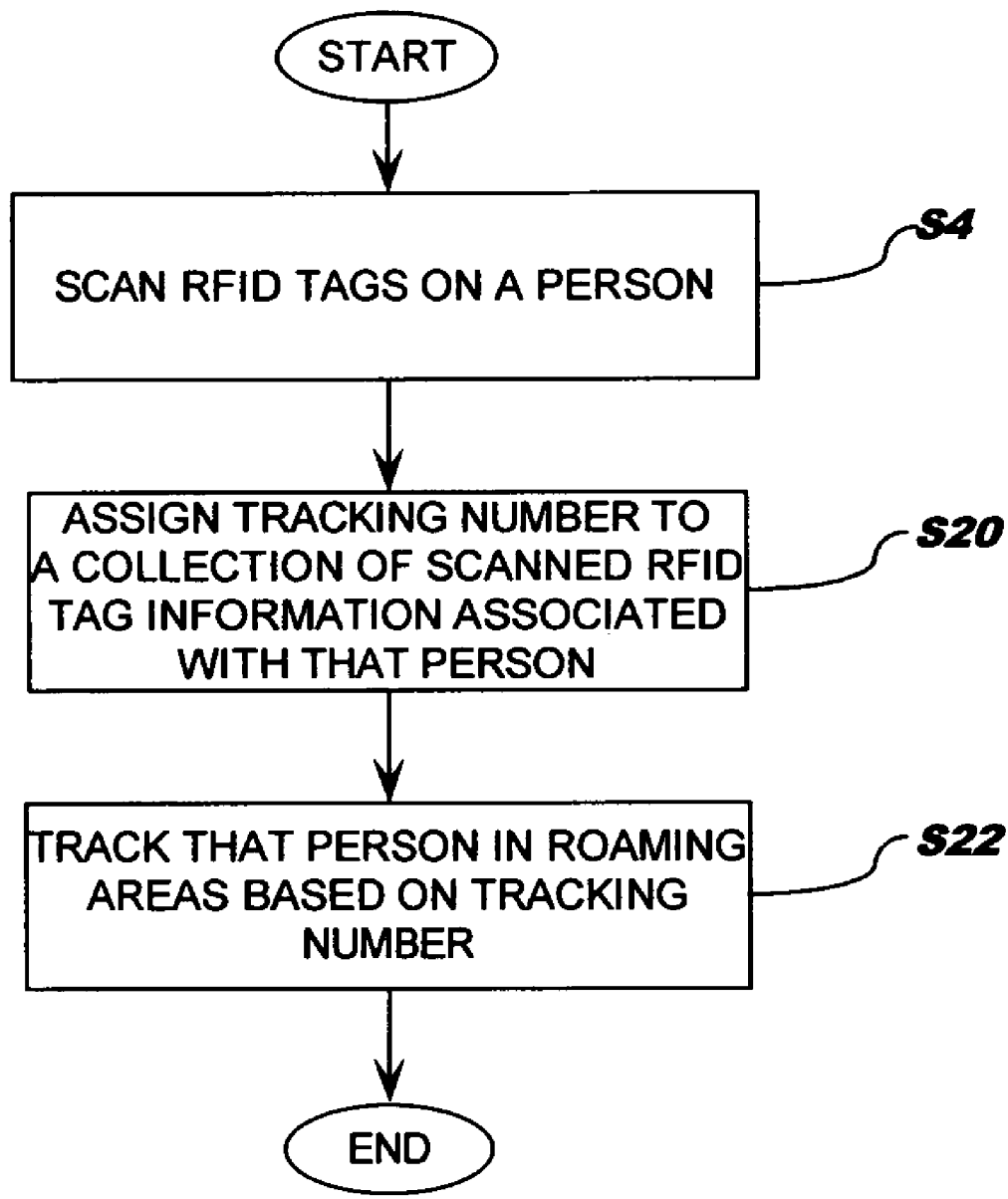
FIG. 4 is a flowchart illustrating the processing steps of a method of tracking persons using RFID-tagged items according to a second embodiment of the present invention.

FIG. 4 is a flowchart illustrating the processing steps of a method of tracking persons using RFID-tagged items according to a second embodiment of the present invention. These processing steps can be implemented by the system 200 of FIG. 3. As shown in FIG. 4, in Step S4, when a person carrying or wearing items having RFID tags 70 enters a scanning area of a particular RFID tag scanner 20, the RFID tag scanner 20 scans the RFID tags on that person and reads the RFID tag information stored in the RFID tags 70. Then the person tracking unit 120 in Step S20 assigns a tracking number or some identification number to the collected RFID tag information to identify the person by this number. In Step S22, as the person moves through roaming areas, different RFID tag scanners 20 located throughout the roaming areas scan the RFID tags carried on that person and the person tracking unit 120 tracks the movement of the person by associating the RFID tag information collected by the different scanners 20 and the tracking or identification number.

Although the systems 100 and 200 of the present invention as illustrated in FIGS. 1 and 3 have been described in context of a retail store, it can be applied to other locations having roaming areas, such as shopping malls, airports, train stations, bus stations, elevators, trains, airplanes, restrooms, sports arenas, libraries, theaters, museums, etc. Furthermore, the components of the system may be located at different locations without affecting the operation of the system. For example, all the components of the system 100 shown in FIG. 1 may be located at the same retail store. In the alternative, the POS terminals 50 may be located at the retail store, and the scanners 20, the correlation module 10, the transaction database 30, and/or the data compiler 40 may be installed at other locations such as airports, train stations, shopping malls, etc.

The present invention has wide applicability. For example, the present invention can be used to track and follow a particular crime suspect through public areas by tracking the identity, location and time the suspect came in contact with others. In another example, RFID tags can be incorporated intoe dangerous or controlled items such as firearms, drugs, medicine, explosives, etc., and appropriate authorities can detect these RFID tags to locate and track these items. Furthermore, the present invention can be used to improve and personalize advertising, promotions, customer service, assistance, etc. to target each person based on the RFID tagged items carried on the person.

In another embodiment, in addition to scanning RFID tags carried on a person, the system 100 or 200 can be configured to access shopping lists, product preferences, or any other information stored in a wireless communication device carried by the person (e.g., a Personal Digital Assistant—PDA, a mobile phone, a two-way pager, etc.) to augment the information collected by scanning the RFID tags on the person. The augmented information can be used to further enhance the application of the present invention. A co-pending U.S. application Ser. No. 09/814,350, filed on Mar. 22, 2001, having a common assignee as the present invention, and entitled "Method and System for Providing Personalized Store-issued Coupons Prior to Shopping," which is herein fully incorporated by reference, teaches a method and system for accessing shopping lists, product preferences and other information stored in PDAs or other wireless communication devices using short-range wireless techniques such as Bluetooth communication techniques or infrared communication techniques. These techniques can be incorporated in the systems of the present invention to obtain additional information about the person from the person's wireless communication device carried by the person.

Furthermore, any information about the person's identity and/or demographics obtained using the present invention can be used to provide more targeted advertising in public places and carriers discussed in a co-pending U.S. application Ser. No. 09/836,963, filed on Apr. 18, 2001, having a common assignee as the present invention, and entitled "Method and System for Providing Targeted Advertising in Public Places and Carriers" which is herein fully incorporated by reference.

The processing steps of the present invention and the elements in the system 100 and 200 can be implemented by computer programs in conjunction with existing hardware, or other devices such as computers, microprocessors, etc. For instance, the correlation module 10 and the person tracking units 12 and 120 can be computers or microprocessors executing the correlation and tracking operations discussed above. Software programming code which embodies the present invention can be stored in storage of some type. The software programming code may be embodied on any of a variety of known media such as a diskette, or hard drive, or CD-ROM, and may be distributed on such media. The techniques and methods for embodying software program code on physical media and/or distributing software code are known in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A computer-implemented method of inferring identifying characteristics associated with a particular person, the method comprising the steps of:
    storing on a computer transaction information representing purchases associated with a plurality of different persons;
    collecting product information from RFID-tagged items carried on a particular person, said product information comprising non-unique identification information;
    correlating, using said computer, the product information with the transaction information;
    inferring identifying characteristics associated with the particular person based on results of the correlating step by comparing said transaction information and identifying at least one set of characteristics associated with an individual, said individual having transaction information indicating that the RFID-tagged items match items purchased by said particular person;
    determining which of said at least one set of characteristics has the highest likelihood of being associated with said particular person based on a set of correlation criteria, said criteria used to narrow a group of individuals to said particular person; and
    inferring said particular person has said determined set of characteristics based upon the results of the determining step.

2. The method of claim 1, wherein the identifying step infers demographics of the particular person based on the results of the correlating step.

3. The method of claim 1, wherein the identifying step infers the exact identity of the particular person based on the results of the correlating step.

4. The method of claim 1, further comprising:
    tracking the particular person as the particular person roams through roaming areas using the inferred identifying characteristics and the product information associated with the particular person.

5. The method of claim 4, further comprising:
    providing targeted advertising using information obtained from said tracking step.

6. The method of claim 1, wherein the product information includes an SKU number associated with a product.

7. The method of claim 1, wherein the RFID-tagged items include RFID tags incorporated therein and carrying the product information.

8. The method of claim 1, wherein the RFID-tagged items include RFID tags incorporated in the RFID-tagged items, said RFID tags carrying product information.

9. A computer-implemented method of inferring the identity of a person based on RFID-tagged items carried on the person, the method comprising the steps of:
    collecting RFID tag information from the RFID-tagged items carried on the person and storing said collected RFID tag information on a computer, said RFID tag information comprising non-unique identification information;
    associating movements of the person with the collected RFID tag information as the person roams through roaming areas using said computer;
    inferring the identity of the person in the roaming areas based on results from the associating step, using said computer by comparing said collected RFID tag information and identifying at least one set of characteristics associated with an individual, said individual having transaction information indicating that the RFID-tagged items match items purchased by said particular person;
    determining which of said at least one set of characteristics has the highest likelihood of being associated with said particular person based on a set of correlation criteria, said criteria used to narrow a group of individuals to said particular person; and
    inferring said particular person has said determined set of characteristics based upon the results of the determining step.

10. The method of claim 9, wherein, in the associating step, the person is associated with the collected RFID tag information without using any information about the exact identity or purchase records of the person.

11. A computer-implemented system for inferring identifying characteristics associated with a particular person, the system comprising:
    a storage unit for storing transaction information representing purchases associated with a plurality of different persons;
    at least one RFID tag scanner for collecting product information from RFID-tagged items carried on a particular person, said product information comprising non-unique identification information; and
    a correlation module, operatively coupled to the storing unit and the RFID tag scanner, for correlating the product information with the transaction information, inferring identifying characteristics associated with the particular person based on the correlation results by comparing said transaction information and identifying at least one set of characteristics associated with an individual, said individual having transaction information indicating that the RFID-tagged items match items purchased by said particular person, determining which of said at least one set of characteristics has the highest likelihood of being associated with said particular person based on a set of correlation criteria, said criteria used to narrow a group of individuals to said particular person, and inferring said particular person has said determined set of characteristics based upon the results of the determining step.

12. The system of claim 11, wherein the correlation module infers demographics of the particular person based on the correlation results.

13. The system of claim 11, wherein the correlation module infers the exact identity of the particular person based on the correlation results.

14. The system of claim 11, wherein the correlation module includes a tracking unit for tracking the particular person as the particular person roams through roaming areas using the inferred identifying characteristics and the product information associated with the particular person.

15. The system of claim 11, wherein the product information includes an SKU number associated with a product.

16. The system of claim 11, wherein the RFID-tagged items include RFID tags incorporated therein and carrying the product information.

17. A system for inferring the identity of a person based on RFID-tagged items carried on the person, the system comprising:
  at least one RFID tag scanner for collecting RFID tag information from the RFID-tagged items carried on the person, said RFID tag information comprising non-unique identification information; and
  a tracking unit, coupled to the RFID tag scanner, for associating movements of the person with the collected RFID tag information as the person roams through roaming areas, inferring the identity of the person in the roaming areas based on the association results by comparing said collected RFID tag information and identifying at least one set of characteristics associated with an individual, said individual having transaction information indicating that the RFID-tagged items match items purchased by said particular person, determining which of said at least one set of characteristics has the highest likelihood of being associated with said particular person based on a set of correlation criteria, said criteria used to narrow a group of individuals to said particular person, and inferring said particular person has said determined set of characteristics based upon the results of the determining step.

18. The system of claim 17, wherein the tracking unit associates the person with the collected RFID tag information without any information about the exact identity or purchase records of the person.

19. A computer program product embodied on computer readable media readable by a computing device, for inferring identifying characteristics associated with a particular person, the computer program product comprising computer executable instructions for:
  storing transaction information representing purchases associated with a plurality of different persons;
  collecting product information from RFID-tagged items carried on a particular person, said product information comprising non-unique identification information;
  correlating the product information with the transaction information;
  inferring identifying characteristics associated with the particular person based on results of the correlation by comparing said transaction information and identifying at least one set of characteristics associated with an individual, said individual having transaction information indicating that the RFID-tagged items match items purchased by said particular person;
  determining which of said at least one set of characteristics has the highest likelihood of being associated with said particular person based on a set of correlation criteria, said criteria used to narrow a group of individuals to said particular person; and
  inferring said particular person has said determined set of characteristics based upon the results of the determining step.

20. The computer program product of claim 19, wherein the computer executable instructions infers demographics of the particular person based on the results of the correlation.

21. The computer program product of claim 19, wherein the computer executable instructions infer the exact identity of the particular person based on the results of the correlation.

22. The computer program product of claim 19, further comprising computer executable instructions for tracking the particular person as the particular person roams through roaming areas using the inferred identifying characteristics and the product information associated with the particular person.

23. The computer program product of claim 19, wherein the product information includes an SKU number associated with a product.

24. The computer program product of claim 19, wherein the RFID-tagged items include RFID tags incorporated therein and carrying the product information.

25. The computer program product of claim 19, wherein the RFID-tagged items include RFID tags incorporated in the RFID-tagged items, said RFID tags carrying product information.

26. A computer program product embodied on computer readable media readable by a computing device, for inferring the identity of a person based on RFID-tagged items carried on the person, the computer program product comprising computer executable instructions for:
  collecting RFID tag information from the RFID-tagged items carried on the person, said RFID tag information comprising non-unique identification information;
  associating movements of the person with the collected RFID tag information as the person roams through roaming areas;
  inferring the identity of the person in the roaming areas based on the associating results by comparing said collected RFID tag information and identifying at least one set of characteristics associated with an individual, said individual having transaction information indicating that the RFID-tagged items match items purchased by said particular person;
  determining which of said at least one set of characteristics has the highest likelihood of being associated with said particular person based on a set of correlation criteria, said criteria used to narrow a group of individuals to said particular person; and
  inferring said particular person has said determined set of characteristics based upon the results of the determining step.

27. The computer program product of claim 26, wherein the person is associated with the collected RFID tag information without any information about the exact identity or purchase records of the person.

* * * * *